Nov. 14, 1939.  A. LATHAM ET AL  2,179,854
COUPLING UNIT
Filed Sept. 19, 1938  2 Sheets-Sheet 1
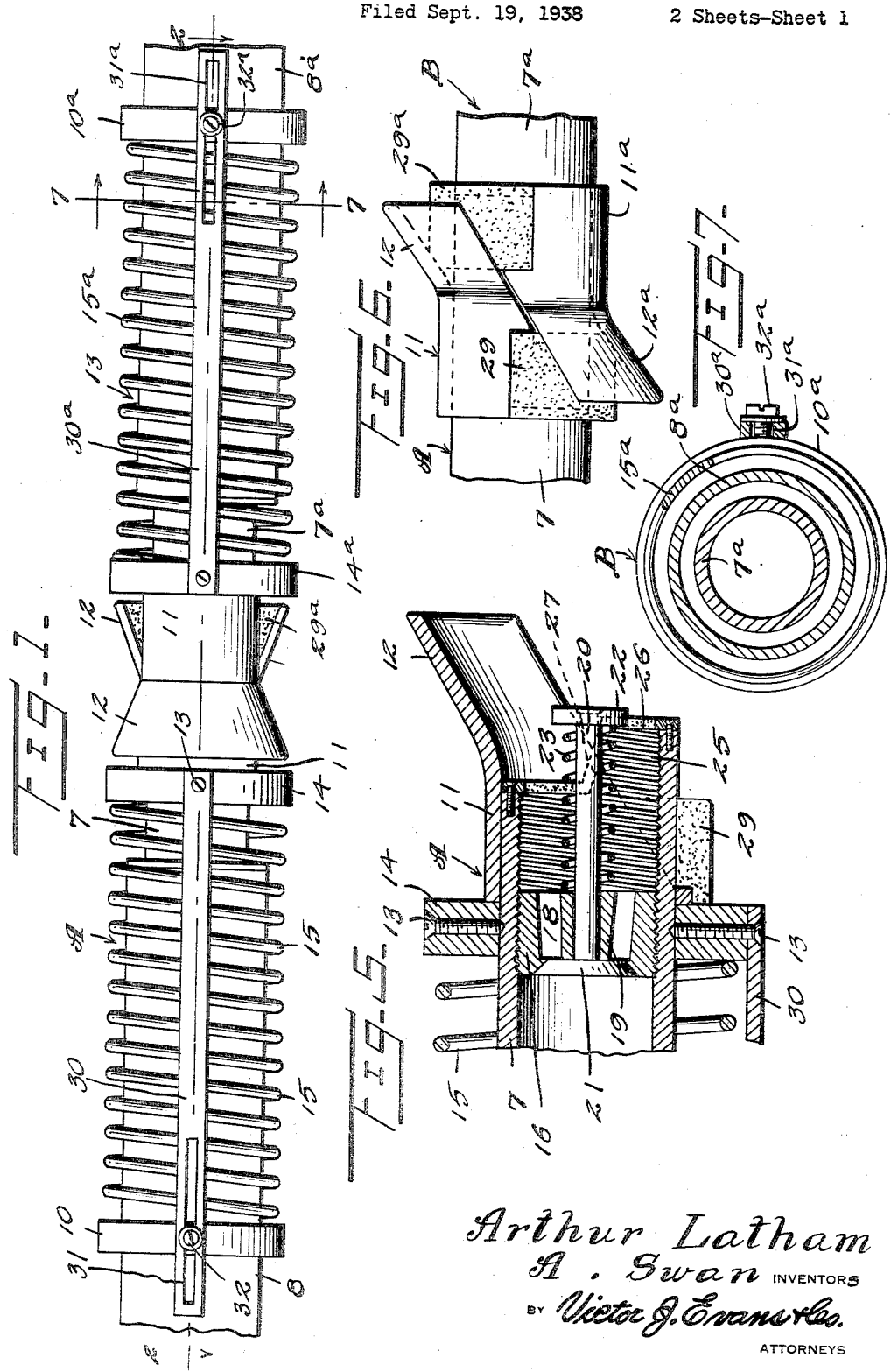
Arthur Latham
A. Swan INVENTORS
BY Victor J. Evans & Co.
ATTORNEYS

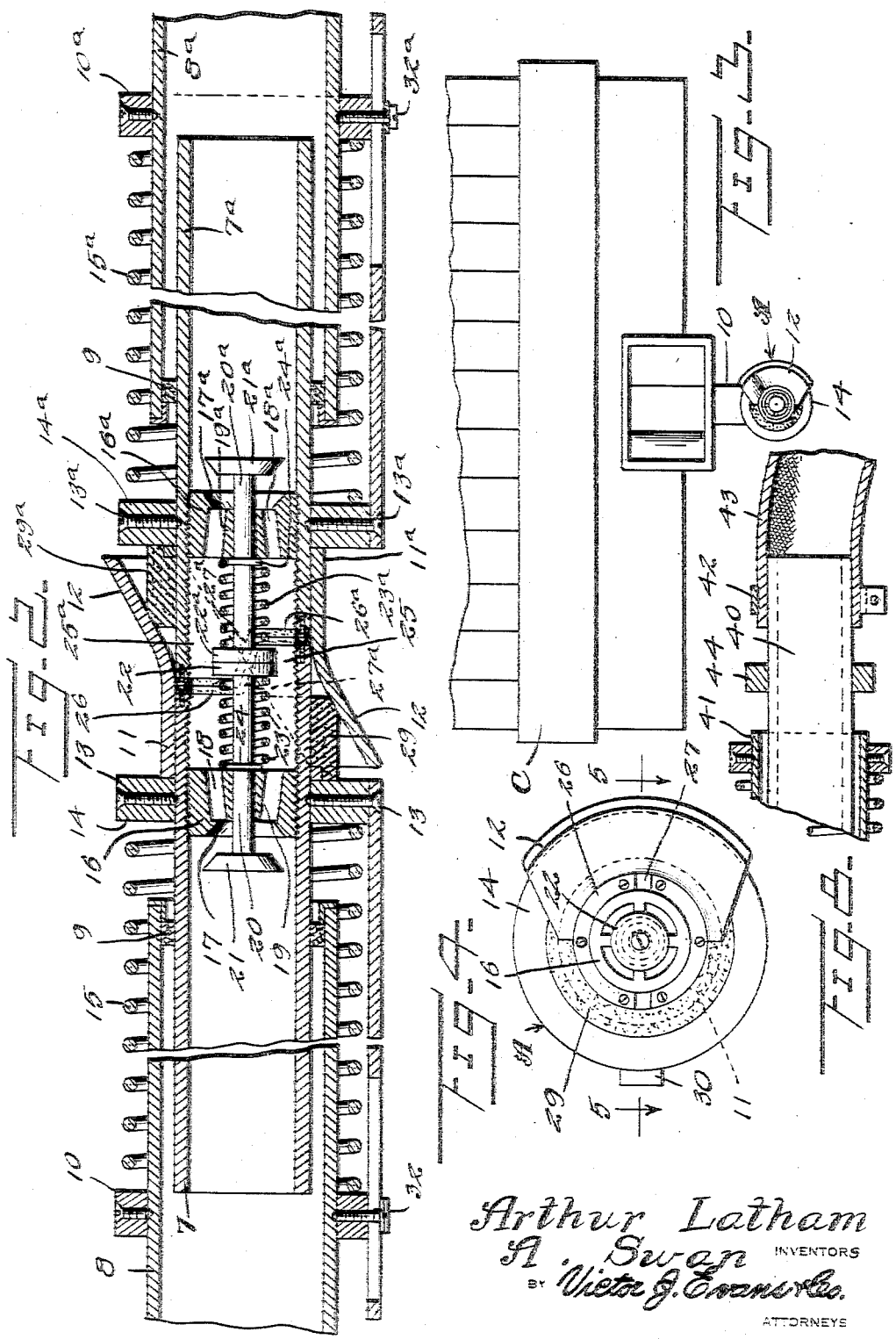

Patented Nov. 14, 1939

2,179,854

UNITED STATES PATENT OFFICE 2,179,854

COUPLING UNIT

Arthur Latham and Aud Swan, Bernie, Mo.

Application September 19, 1938, Serial No. 230,736

3 Claims. (Cl. 284—11)

Our invention relates to improvements in coupling units designed primarily for the automatic connection and disconnection of air lines throughout the length of a train or the like.

One of the principal objects of our invention is to provide a coupling device wherein the heads are arranged and constructed for the automatic connection or disconnection with each other to unite, when connected, to form an efficient connection between the air lines of adjacent cars, the coupling units operating automatically and without attention in the coupling and uncoupling of the cars.

Another object of our invention is to provide a device of the above described character wherein the heads of the coupling units are provided with means for effecting a seal therebetween when said heads are in coupled condition to preclude the escape of air therefrom.

A further object of our invention is to provide a device of the character described equipped with air valves within the heads of the coupling units and said valves operable to open and closed positions upon connection and disconnection of said heads respectively.

An important object of our invention is to provide a device of the character described which is simple in construction, durable in use, efficient in operation and economical in manufacture.

A special object of our invention is to provide a device of the above described character capable of being attached to cars already in use without substantially modifying the latter.

Other objects and advantages will be apparent from the following description, appended claims and annexed drawings.

Referring to the drawings wherein like reference characters designate like parts throughout the several views:

Figure 1 is a side elevation of our invention.

Figure 2 is a sectional view taken on the line 2—2 of Figure 1.

Figure 3 is an end elevation of one of the coupling units illustrating the latter as attached to the end of a car.

Figure 4 is an end elevation of one of the coupling units on an enlarged scale.

Figure 5 is a sectional view taken on the line 5—5 of Figure 4 and ilustrating the valve therein in closed position.

Figure 6 is a detail top plan view of the coupling heads in connected condition.

Figure 7 is a detail sectional view taken on the line 7—7 of Figure 1.

Figure 8 is a detail longitudinal sectional view of the rear end of a modified form of coupling unit.

In practicing our invention we provide, as illustrated in the drawings, coupling units A and B adapted for connection with each other in a manner to form our novel coupling as hereinafter described. Inasmuch as the units A and B are of a substantially identical construction, a detailed description of unit A will suffice, it being understood for the purpose of description that the reference numerals indicative of unit A are set forth with the exponents "a" as indicative of like parts of unit B.

The unit A comprises inner and outer tubes 7 and 8 respectively having secured therebetween, adjacent the front end of said outer tube 8, a gasket 9 through which the inner tube 7 is adapted to slide as hereinafter more fully described. The rear end of the outer tube 8 is fixed within the lower end of a hanger 10 mounted on the end of a car C subjacent the coupling thereof. Said rear end of said outer tube has secured thereto the end of an air pipe or line (not shown) for transmitting air for brake operation and the like throughout the length of a train of said cars.

The outer end of the inner tube 7 has secured thereto a head 11 fashioned with an outwardly and laterally flared section 12 on one side thereof. Secured about said inner tube by means of screws 13 is a collar 14 adjacent the inner end of the head 11. Interposed between the hanger 10 and collar 14 is a coil spring 15 surrounding said tubes and normally urging the outer end of said inner tube axially without said outer tube.

The front end of the inner tube has threaded within the bore thereof a bushing 16 formed with a valve seat 17, longitudinally extending air passages 18 the ends of which are encompassed by said seat, and a centrally disposed bearing 19 through which slidably extends a valve stem 20, the inner end of which is provided with a valve member 21 for seating within said seat to effect closure of said passages as hereinafter set forth. The outer end of said valve stem 20 is provided with a contact plate 22. Interposed between said contact plate 22 and bearing 19 is a coil spring 23 surrounding said stem 20 and normally urging the latter towards the outer end 12 of the head to effect closure of the passages 18 by the member 21. A collar 24 is fixed to the stem 20 for engagement with the outer face of the bushing 16 to limit the inward movement of said stem.

The front end of said tube 7 is formed on one side thereof with an outwardly extending portion 25 having arcuate and inclined faces 26 and 27 respectively coacting with like faces 26a and 27a on the forwardly extending portion 25a of the inner tube 7a carried by the unit B whereby to effect a tight or sealed fit therebetween through the medium of gaskets 28 and 28a interposed between said oppositely disposed faces and secured to said faces of the portions 25 and 25a respectively as illustrated in the drawings.

Rearwardly of the flared section 12 and engaging the inclined faces of the latter are semicircular washers or gaskets 29 mounted on the outer end of the inner tube 7 for engaging the inner wall of the oppositely disposed flared section 12a whereby to effect a seal therebetween.

The unit A is provided with a longitudinally extending bar 30, the outer end of which is fixed to the periphery of the collar 14 by one of said screws 13. The inner end of said bar is formed with a longitudinally extending slot 31 which slidably receives therethrough a screw 32 which slidably connects said inner end to the hanger 10 as clearly illustrated in Figure 2. Obviously, longitudinal movement of the inner tube 7 relative to the outer tube 8 and said hanger 10 is limited through the medium of the end walls of the slots 31 engaging the shank of the screws 32 extending therethrough thereby precluding accidental displacement of the tube 7 without the tube 8 through the medium of the spring 15 or otherwise.

In operation, when adjacent cars of a train are connected together, the outer ends of the tubes 7 and 7a abut each other within the flared sections 12 and 12a of the heads 11 and 11a and thus through engagement of the plates 22 and 22a unseat valve members 21 and 21a, thereby permitting air to be transmitted from one inner tube to the other through the medium of the passages 18 and 18a.

It is to be understood that the gaskets 28 and 28a coact to form a seal between said inner tubes when in coupled condition as likewise the gaskets 29 and 29a coact with the flared sections 12a and 12 respectively. When the cars are uncoupled, the units A and B will be moved away from each other, thereby permitting the valve member 21 and 21a to seat within the seats 17 and 17a respectively through the medium of the coil springs 23 and 23a to close the outer ends of said inner tubes. The foregoing is descriptive of a preferred embodiment of our invention as illustrated in Figures 1 to 7 inclusive of the drawings.

In the modified form illustrated in Figure 8 the inner ends of the inner tubes 40 extend an appreciable distance beyond the inner ends of the outer tubes 41 and have secured thereon by means of clamps 42 the ends of an air hose 43. Said inwardly extending ends of the inner tubes are provided with a collar 44 for engagement with the inner ends of the tubes 41 thereby to limit the outward movement of the tubes 40.

From the foregoing it will be apparent that we have provided a simple and efficient coupling operable for conducting air from one car to another of a train for the operation of the brakes thereof and the like.

While we have shown and described our invention as being adaptable for air lines, it is to be distinctly understood that the same may be readily utilized in connection with steam and liquid lines without departing from the spirit of the invention or scope of the appended claims.

What we claim is:

1. A coupling of the class described, comprising, a pair of like opposed units each having outer and inner tubes, said outer tubes each having a front end and a rear end adapted for connection to an air pipe line, said inner tubes slidably mounted within said outer tubes and provided with rear ends terminating within said outer tubes and with front ends having gasketed faces for engagement with each other to effect a seal when said units are connected together, collars secured on said inner tubes forwardly of the front ends of said outer tubes, hangers connected to said outer tubes rearwardly of the front ends thereof, coil springs sleeved about said tubes and engaging said collars and hangers for urging said inner tubes out of said outer tubes, gaskets mounted within said outer tubes adjacent the front ends thereof and slidably receiving said inner tubes whereby to effect a seal between said outer and inner tubes respectively, and spring pressed valves mounted within said inner tubes and equipped with outwardly extending stems adapted for engagement with each other to maintain said valves in open positions when said units are in said connected condition and said valves operable to closed positions upon disengagement of said stems from each other when said units are in disconnected relation.

2. A coupling of the class described, comprising, a pair of like opposed units each having outer and inner tubes, said outer tubes each having a front end and a rear end adapted for connection to an air pipe line, said inner tubes slidably mounted within said outer tubes and provided with rear ends terminating within said outer tubes and with front ends having gasketed faces for engagement with each other to effect a seal when said units are connected together, collars secured on said inner tubes forwardly of the front ends of said outer tubes, hangers connected to said outer tubes rearwardly of the front ends thereof, coil springs sleeved about said tubes and engaging said collars and hangers for urging said inner tubes out of said outer tubes, gaskets mounted within said outer tubes adjacent the front ends thereof and slidably receiving said inner tubes whereby to effect a seal between said outer and inner tubes respectively, spring pressed valves mounted within said inner tubes and equipped with outwardly extending stems adapted for engagement with each other to maintain said valves in open positions when said units are in said connected condition and said valves operable to closed positions upon disengagement of said stems from each other when said units are in disconnected relation, heads mounted on said inner tubes and formed with flared sections overlying said gasketed faces for interfitting relation with each other, and gaskets mounted on said inner tubes adjacent said front ends thereof for coaction with said flared sections to effect a seal therebetween when said units are in said connected condition.

3. A coupling of the class described, comprising, a pair of like opposed units each having outer and inner tubes, said outer tubes each having a front end and a rear end adapted for connection to an air pipe line, said inner tubes slidably mounted within said outer tubes and provided with rear ends terminating within said outer tubes and with front ends having gasketed faces for engagement with each other to effect a seal when said units are connected together, collars secured on said inner tubes forwardly of the front ends of said outer tubes, hangers connected to said outer tubes rearwardly of the front ends thereof, coil springs sleeved about said tubes and engaging said collars and hangers for urging said inner tubes out of said outer tubes, gaskets mounted within said outer tubes adjacent the front ends thereof and slidably receiving said inner tubes whereby to effect a seal between said outer and inner tubes respectively, spring pressed valves mounted within said inner tubes and equipped with outwardly extending stems adapted for engagement with each other to maintain said valves in open positions when said units are in said connected condition and said valves operable to closed positions upon disengagement of said stems from each other when said units are in disconnected relation, heads mounted on said inner tubes and formed with flared sections overlying said gasketed faces for interfitting relation with each other, gaskets mounted on said inner tubes adjacent said front ends thereof for coaction with said flared sections to effect a seal therebetween when said units are in said connected condition, and means fixed to said inner tubes and slidably connected to said outer tubes for limiting the outward movement of said inner tubes when said units are disconnected one from the other.

ARTHUR LATHAM.
AUD SWAN.